United States Patent
Kajimura

(10) Patent No.: US 9,294,835 B2
(45) Date of Patent: Mar. 22, 2016

(54) IMAGE CAPTURING APPARATUS, SIGNAL PROCESSING APPARATUS AND METHOD

(71) Applicant: CANON KABUSHIKI KAISHA, Tokyo (JP)

(72) Inventor: Fumihiro Kajimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 14/220,588

(22) Filed: Mar. 20, 2014

(65) Prior Publication Data

US 2014/0293095 A1 Oct. 2, 2014

(30) Foreign Application Priority Data

Mar. 29, 2013 (JP) .................................. 2013-074855

(51) Int. Cl.
*H04R 3/00* (2006.01)
*H04N 5/232* (2006.01)
*G10L 21/0208* (2013.01)

(52) U.S. Cl.
CPC .............. *H04R 3/00* (2013.01); *G10L 21/0208* (2013.01); *H04N 5/23258* (2013.01)

(58) Field of Classification Search
CPC  H04N 5/23258; G10L 21/0208; G10L 21/02; H04R 3/00
See application file for complete search history.

(56) References Cited

U.S. PATENT DOCUMENTS

| 7,711,557 | B2 * | 5/2010 | Ozawa .................... G10L 21/01 704/226 |
| 8,645,131 | B2 * | 2/2014 | Rao ......................... G10L 25/78 704/233 |
| 2004/0032509 | A1 * | 2/2004 | Owens et al. .............. 348/222.1 |
| 2007/0150261 | A1 * | 6/2007 | Ozawa ....................... 704/200.1 |
| 2010/0100382 | A1 * | 4/2010 | Rao et al. ..................... 704/254 |
| 2012/0140103 | A1 * | 6/2012 | Kimura ................... G01L 21/02 348/335 |

FOREIGN PATENT DOCUMENTS

| JP | 06-244808 A | 9/1994 |
| JP | 2008-077707 A | 4/2008 |

* cited by examiner

*Primary Examiner* — Ahmed A Berhan
(74) *Attorney, Agent, or Firm* — Cowan, Liebowitz & Latman, P.C.

(57) ABSTRACT

A signal processing apparatus reduces noise by generating an interpolated signal for a noise-containing period using audio signals in periods before and after the noise-containing period, and replacing an audio signal in the noise-containing period with the interpolated signal. Here, the signal processing apparatus determines whether a phoneme is the same or different between before and after the noise-containing period, and controls a method for generating the interpolated signal in accordance with a result of the determination.

11 Claims, 19 Drawing Sheets

F I G. 12
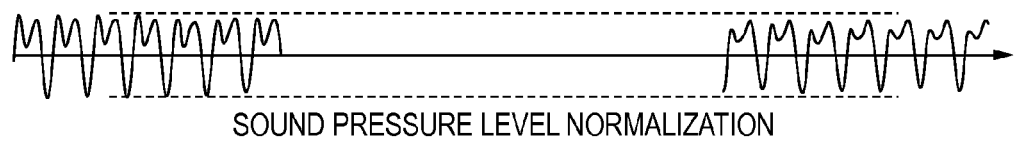
SOUND PRESSURE LEVEL NORMALIZATION

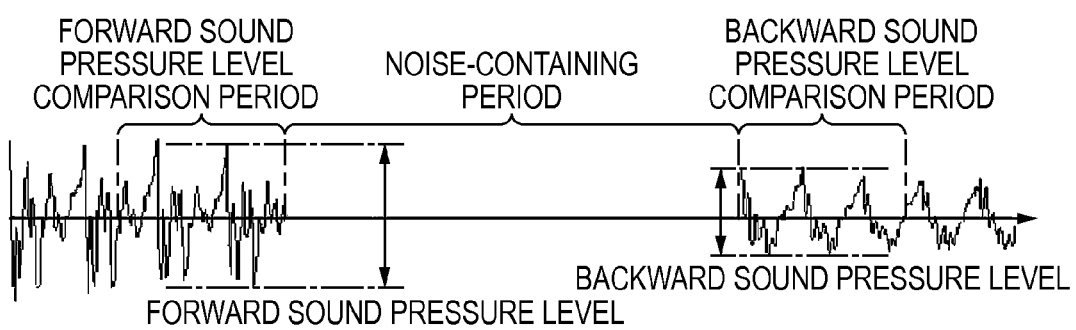
F I G. 14

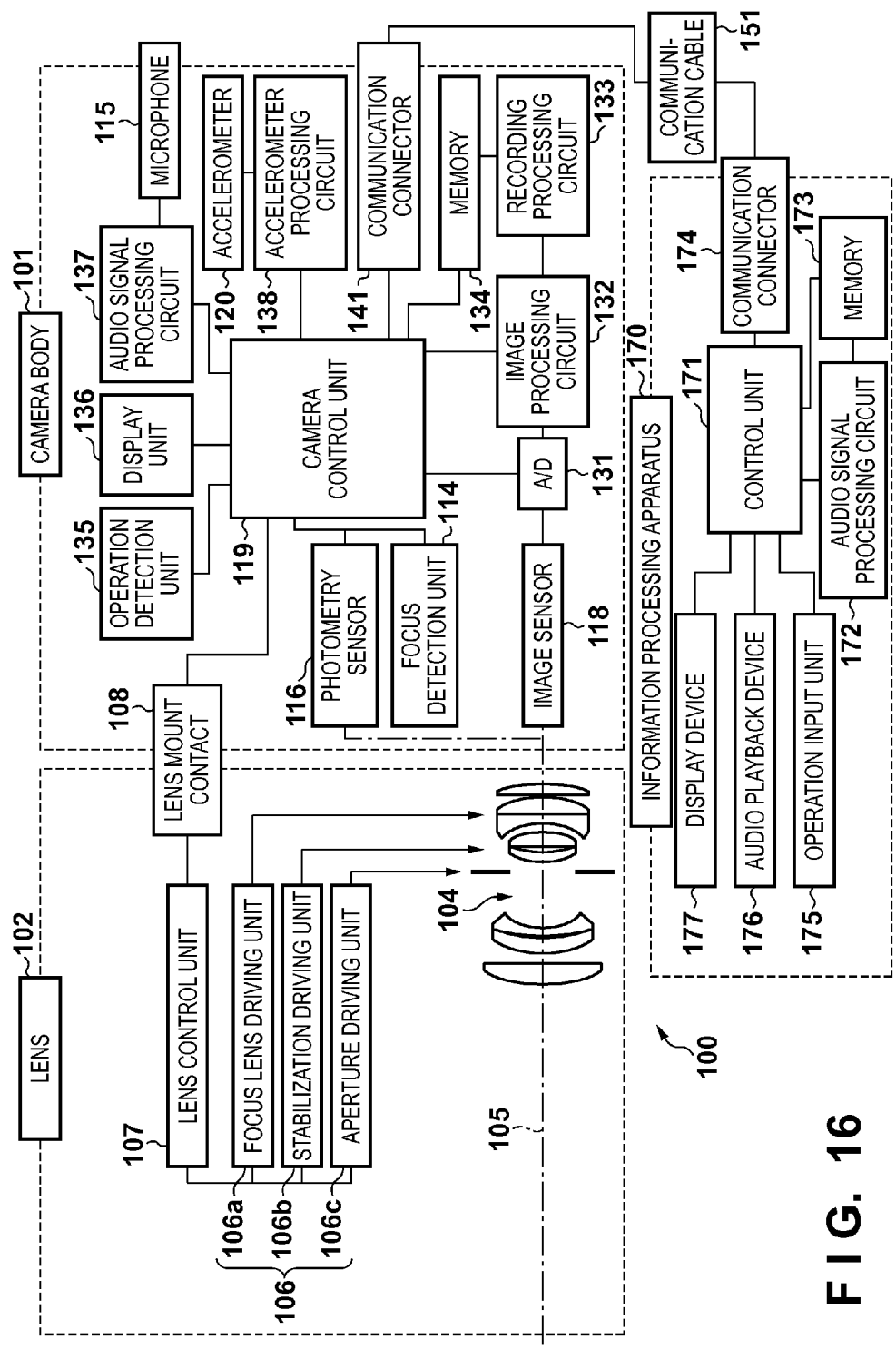
F I G. 16

IMAGE CAPTURING APPARATUS, SIGNAL PROCESSING APPARATUS AND METHOD

BACKGROUND OF THE INVENTION

1. Field of the Invention

The present invention relates to noise reduction techniques.

2. Description of the Related Art

In addition to functions for capturing still images, some recent digital cameras have functions for capturing video, which involves recording audio signals. In such an image capturing apparatus, driving units operate when capturing video in order to drive a focus lens based on changes in shooting states, drive an aperture mechanism based on changes in the brightness of a subject, and so on. There is a problem in that the operating sounds of such driving units mix in with the recorded audio as noise. As such, a variety of conventional techniques have been disclosed for driving noise reduction processing.

Japanese Patent Laid-Open No. 2008-077707 relates to the removal of driving noise produced by a storage device in a video camera. According to Japanese Patent Laid-Open No. 2008-077707, audio that does not contain noise is predicted based on an audio signal occurring before and after a period in which driving noise is present, and the data of the driving noise-containing period is replaced with the predicted data. This technique makes it possible to record audio that does not contain driving noise even if a high level of driving noise is present.

Although unrelated to driving noise reduction, Japanese Patent Laid-Open No. 06-244808 discloses performing interpolation through audio prediction. Japanese Patent Laid-Open No. 06-244808 discloses a technique in which when an error has occurred during audio decoding, the signal of the period where the error occurred is predicted from a past audio signal and the signals are then interpolated.

A technique such as that described above, where audio that does not contain noise is predicted from audio data occurring before and after a noise-containing period, is comparatively effective. However, in the case where the noise-containing period is long, the signal waveform of the sound may change within that period. For example, in the case where the noise-containing period lasts 100 milliseconds, it is entirely possible for the sound "ah" to occur toward the beginning of the period but then change to "oh" by the end of the period. If a predicted signal is then created from the parts of signal before and after the noise-containing period and the two are combined to interpolate the audio as in Japanese Patent Laid-Open No. 2008-077707, the "ah" and "oh" sound will be mixed together, resulting in unnatural audio being generated. Japanese Patent Laid-Open No. 06-244808, meanwhile, interpolates the audio for long noise-containing periods by predicting the audio while gradually attenuating the predicted waveform, but if the same audio is present before and after the noise-containing period, the resulting audio will have a reduced sound pressure and will thus sound unnatural.

SUMMARY OF THE INVENTION

The present invention improves upon techniques for predicting audio that does not contain noise from audio signals before and after a noise-containing period, and achieves effective noise reduction while suppressing audio quality degradation to the greatest extent possible.

According to one aspect of the present invention, a signal processing apparatus includes a detection unit configured to detect, in a received audio signal, a noise-containing period in which noise is mixed in, a determination unit configured to determine whether a phoneme is the same or different between before and after the noise-containing period, and a noise reduction unit configured to reduce the noise by generating an interpolated signal for the noise-containing period using audio signals in backward and forward periods of the noise-containing period and replacing the audio signal of the noise-containing period with the interpolated signal, wherein the noise reduction unit controls a method for generating the interpolated signal in accordance with a result of the determination performed by the determination unit.

Further features of the present invention will become apparent from the following description of exemplary embodiments (with reference to the attached drawings).

BRIEF DESCRIPTION OF THE DRAWINGS

FIG. 12 is a schematic diagram illustrating a post-sound pressure correction audio signal according to the first embodiment.

FIG. 14 is a schematic diagram illustrating an audio signal according to the second embodiment.

FIG. 16 is a block diagram illustrating the signal processing system according to the third embodiment.

DESCRIPTION OF THE EMBODIMENTS

Figure 1:
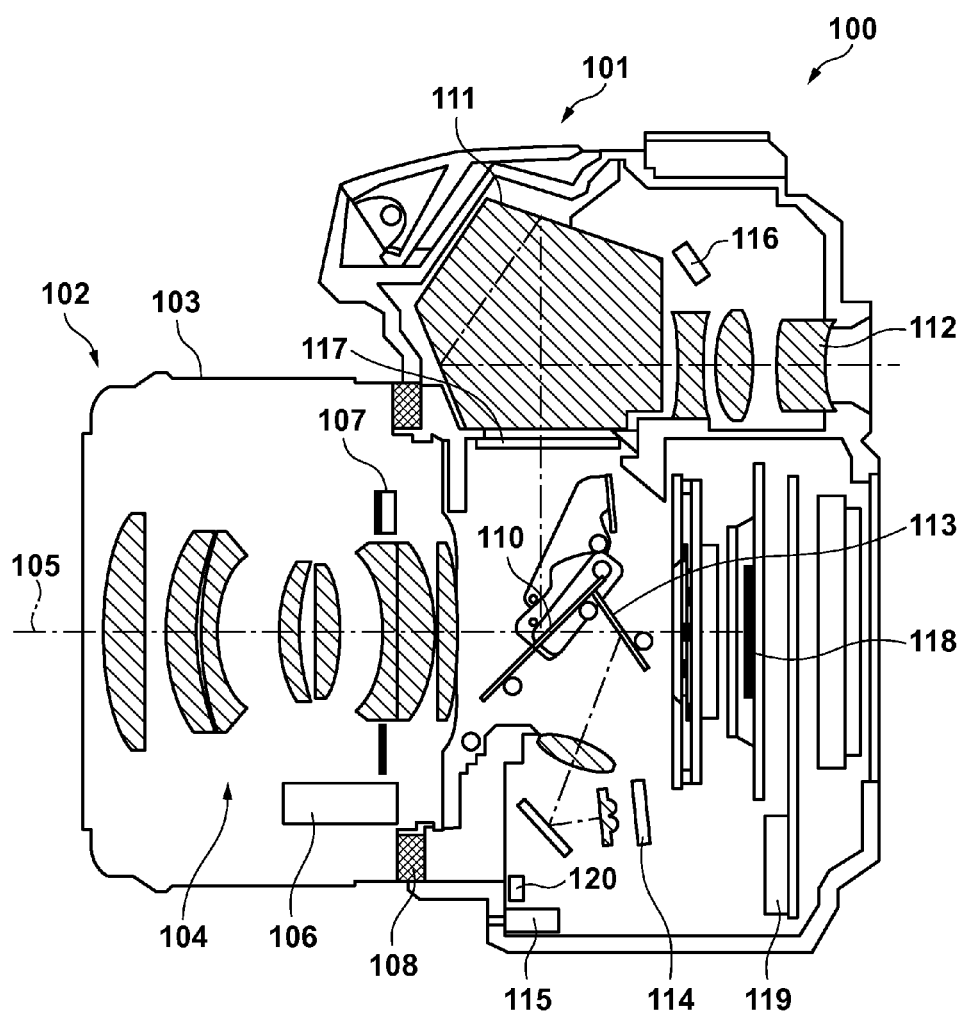
FIG. 1 is a cross-sectional view of a single-lens reflex digital camera according to a first embodiment.

Various exemplary embodiments, features, and aspects of the invention will be described in detail below with reference to the drawings. It should be noted that the configurations described in the following embodiments are merely examples, and that the present invention is not intended to be limited to the configurations described therein and illustrated in the drawings.

First Embodiment

FIG. 1 is a cross-sectional view of a single-lens reflex digital camera 100 according to a first embodiment. As shown in FIG. 1, the single-lens reflex digital camera 100, which serves as an image capturing apparatus, is configured of a camera body 101 and an imaging lens 102. The imaging lens 102 includes an imaging optical system 104 having an optical axis 105, located within a lens barrel 103. The imaging lens 102 further includes a focus lens group included in the imaging optical system 104, an image stabilization lens unit, a lens driver 106 that drives an aperture mechanism, and a lens control unit 107 that controls the lens driver 106. The imaging lens 102 is electrically connected to the camera body 101 via a lens mount contact 108.

An optical image of a subject that enters from the front of the imaging lens 102 enters the camera body along the optical axis 105, is partially reflected by a main mirror 110 configured of a half mirror, and forms an image upon a focusing screen 117. The optical image formed upon the focusing screen 117 can be viewed through an eyepiece window 112 via a pentaprism 111. A photometry sensor 116, which serves as an exposure detection unit, detects the brightness of the optical image formed on the focusing screen 117. The optical image of the subject that has passed through the main mirror 110 is reflected by a sub mirror 113, enters into a focus detection unit 114, and is used for focus detection computations for the subject image. When a release button (not shown) in the camera body 101 is operated and a command to commence shooting occurs, the main mirror 110 and the sub mirror 113 withdraw from a shooting optical path so that the optical image of the subject is incident on an image sensor 118. Light rays incident on the focus detection unit 114, the photometry sensor 116, and the image sensor 118 are respectively converted into electrical signals, sent to a camera control unit 119, and are used to control a camera system. Furthermore, audio from the subject is input from a microphone 115 when capturing video, and the audio is sent to the camera control unit 119 and recorded in synchronization with a signal of the optical image of the subject incident on the image sensor 118. An accelerometer 120, which serves as a vibration detection unit, is disposed on an inner-side surface of the camera body 101 in the vicinity of the microphone 115. The accelerometer 120 can detect vibrations that occur when the lens driver 106 drives mechanisms such as the focus lens group, the image stabilization lens unit, and the aperture mechanism and that are transmitted to the imaging lens 102 and the camera body 101. The camera control unit 119 can calculate a noise-containing period by analyzing a result of the vibration detection.

Figure 2:
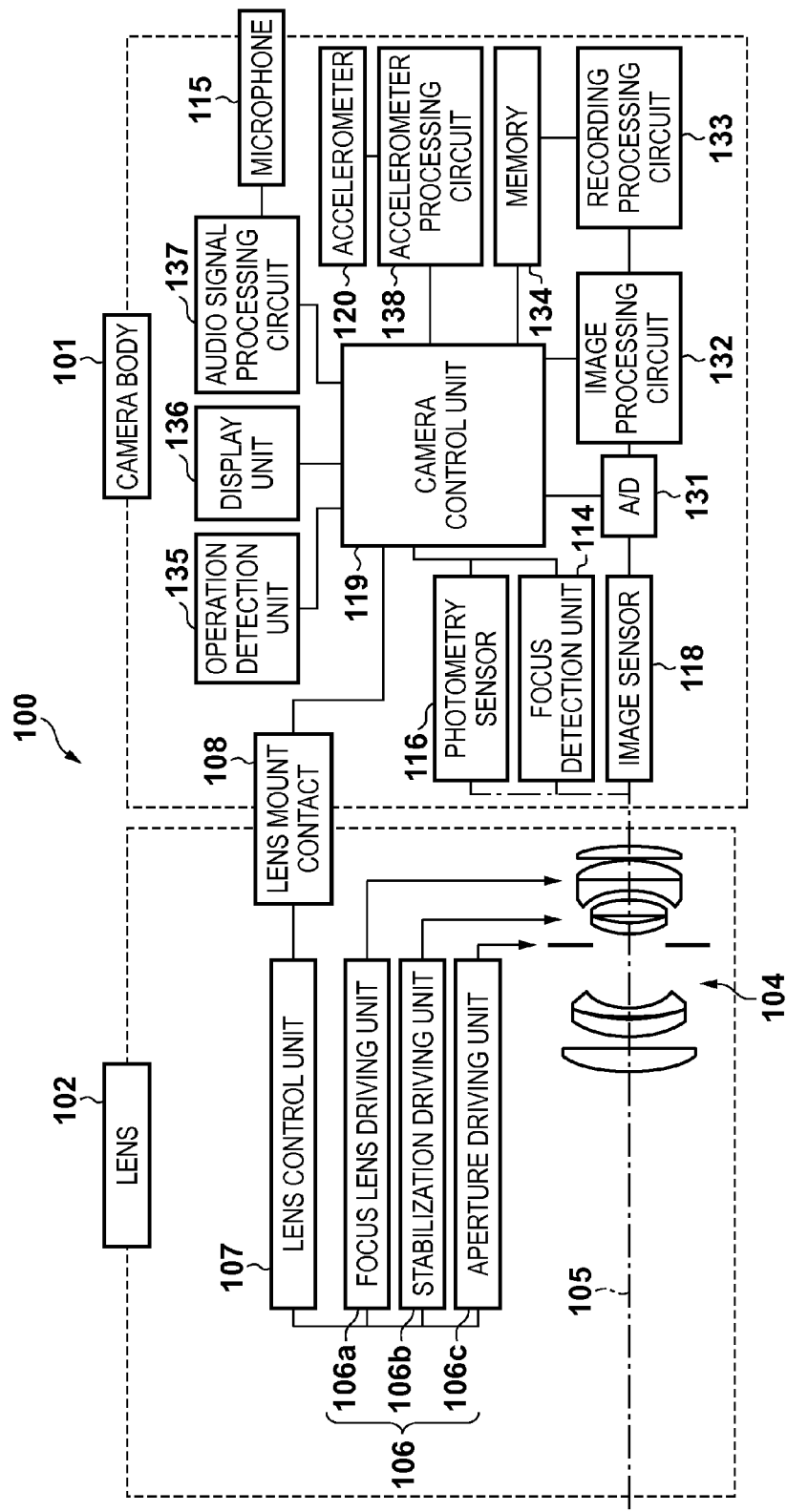
FIG. 2 is a block diagram illustrating the configuration of the single-lens reflex digital camera according to the first embodiment.

FIG. 2 is a block diagram illustrating electrical control carried out in the single-lens reflex digital camera 100. The camera includes an image capturing system, an image processing system, an audio processing system, a recording/ playback system, and a control system. The image capturing system includes the imaging lens 102 and the image sensor 118. The image processing system includes an A/D converter 131 and an image processing circuit 132. The audio processing system includes the microphone 115 and an audio signal processing circuit 137. The recording/playback system includes a recording processing circuit 133 and a memory 134. The control system includes the camera control unit 119, the focus detection unit 114, the photometry sensor 116, an operation detection unit 135, the lens control unit 107, and the lens driver 106. The lens driver 106 includes a focus lens driving unit 106a, a stabilization driving unit 106b, and an aperture driving unit 106c.

The image capturing system is an optical processing system that forms an image of light from an object on an image capturing surface of the image sensor 118 via the imaging optical system 104. During shooting preparation operations such as aiming, a light flux is partially conducted to the focus detection unit 114 as well, via the mirror provided as the main mirror 110. The image sensor 118 can be exposed with an appropriate amount of light from the object, and the subject image can be formed in the vicinity of the image sensor 118, by adjusting the imaging optical system as appropriate using the control system, as will be described later.

The image processing circuit 132 is a signal processing circuit that processes image signals equivalent to a number of pixels in the image sensor 118, received from the image sensor 118 via the A/D converter 131. The image processing circuit 132 includes a white balance circuit, a gamma correction circuit, an interpolation computation circuit that increases resolutions through interpolation computations, and so on.

In the audio processing system, the audio signal processing circuit 137 generates a recording audio signal by executing appropriate processes on the signal input from the microphone 115. The recording audio signal is linked with an image and recorded by a recording processing unit, which will be mentioned later.

The accelerometer 120 is connected to the camera control unit 119 via an accelerometer processing circuit 138. An acceleration signal indicating vibrations in the camera body 101 detected by the accelerometer 120 undergoes amplification, bypass filtering, and low-pass filtering in the accelerometer processing circuit 138, and is processed so that a target frequency is detected.

The recording processing circuit 133 outputs the image signals to the memory 134, and generates and stores images to be output to a display unit 136. Meanwhile, the recording processing circuit 133 compresses and records data such as still images, video, audio, and so on using predetermined methods.

The camera control unit 119 generates and outputs timing signals when capturing images. The focus detection unit 114 and the photometry sensor 116 detect a focus state of the image capturing apparatus and a brightness of the subject, respectively. The lens control unit 107 adjusts the optical system by driving the lenses as appropriate in accordance with signals from the camera control unit 119.

The control system furthermore controls the image capturing system, the image processing system, and the recording/ playback system in accordance with operations made from the exterior. For example, when the operation detection unit 135 detects that a shutter release button (not shown) has been depressed, the camera control unit 119 controls the driving of the image sensor 118, operations performed by the image processing circuit 132, compression processes performed by the recording processing circuit 133, and so on in response thereto. The camera control unit 119 further controls displays in the display unit 136, which is configured of an optical viewfinder, a liquid-crystal monitor, or the like.

Next, operations performed for adjusting the optical system of the control system will be described. The focus detection unit 114 and the photometry sensor 116, which serves as the exposure detection unit, are connected to the camera control unit 119, and the camera control unit 119 finds an appropriate focal position and aperture value based on signals therefrom. The camera control unit 119 then issues instructions to the lens control unit 107 via the lens mount contact 108 based on the found focal position and aperture value, and the lens control unit 107 then controls the focus lens driving unit 106a and the aperture driving unit 106c as appropriate. A camera shake detection sensor (not shown) is further connected to the lens control unit 107, and when an image stabilization mode is active, the lens control unit 107 controls the stabilization driving unit 106b as appropriate based on a signal from the camera shake detection sensor. Meanwhile, when capturing video, the main mirror 110 and the sub mirror 113 withdraw from the optical path through which light is incident on the image sensor 118 along the optical axis 105, and thus the optical image of the subject is not incident on the focus detection unit 114 and the photometry sensor 116. Accordingly, the camera control unit 119 adjusts the focus state of the imaging optical system using a contrast-based focus detection unit through a technique known as "hill-climbing", which uses continuous image information obtained based on a driving amount of the focus lens driving unit 106a and the amount of exposure of the image sensor 118. The camera control unit 119 also adjusts an aperture state by calculating the brightness of the subject image using image information obtained based on the amount of exposure of the image sensor 118.

Referring FIG. 3, noise reduction processing that employs conventional audio prediction will be described. The noise reduction processing according to the present embodiment carries out a prediction process that predicts an audio signal in a driving noise-containing period using audio signals before and/or after the driving noise-containing period.

Figure 3:
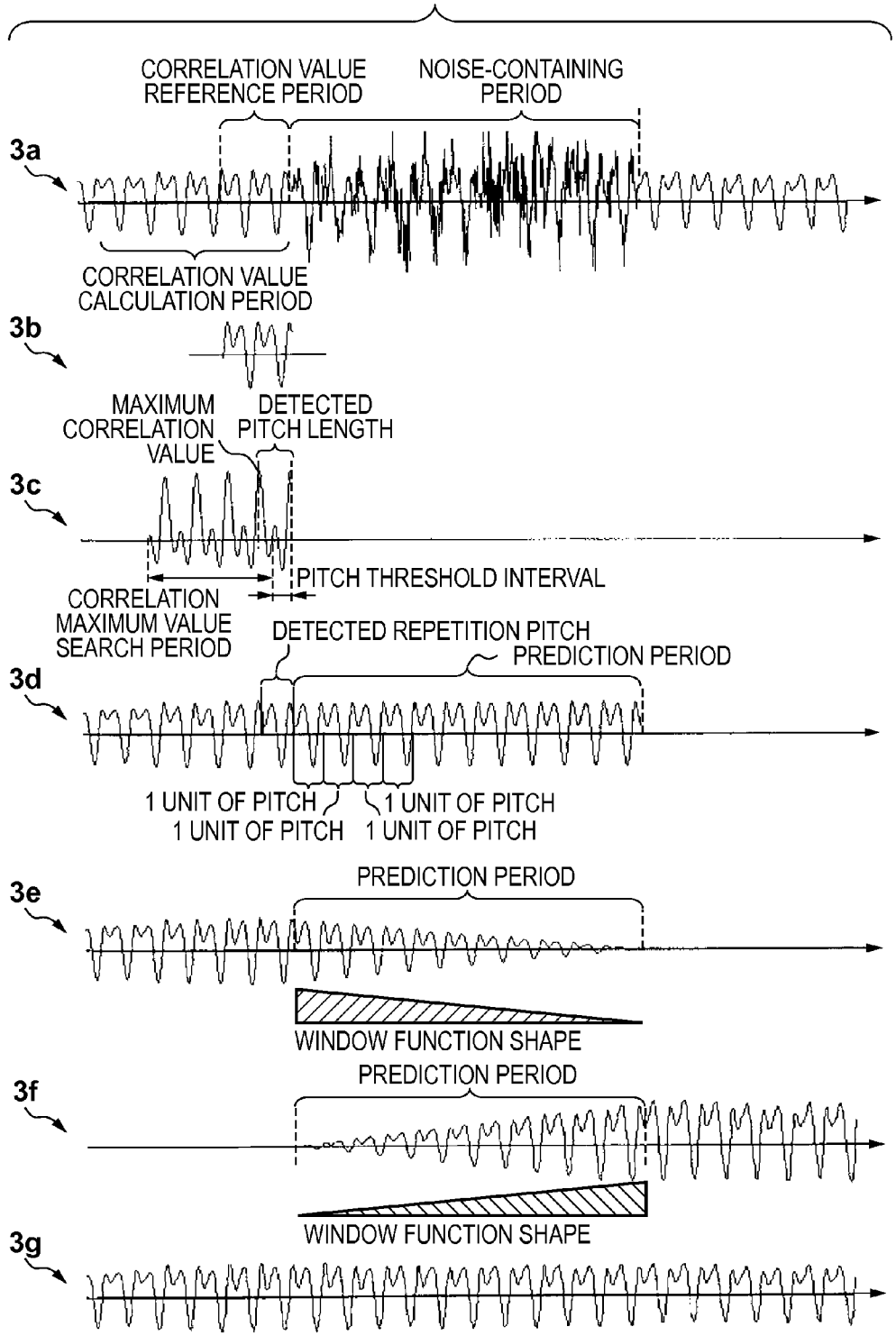
FIG. 3 is a diagram illustrating a conventional audio prediction process.

In, FIG. 3, waveforms 3a-3g illustrate an example of the audio signal at each stage of the prediction process. The horizontal axes in the waveforms 3a-3g represent time. The vertical axes in waveforms 3a, 3b, and 3d to 3g represent a signal level. The vertical axis in the waveform 3c represents a correlation value.

In FIG. 3, the waveform 3a illustrates a received audio signal, and driving noise from the aperture is present in a period of the audio signal. The waveform 3b illustrates an audio signal in a correlation value reference period used for pitch detection. The waveform 3c illustrates a correlation value found from the correlation value reference period and a correlation value calculation period, and a pitch detected therefrom. Note that the correlation value reference period is, for example, a period spanning a predetermined amount of time (0.01 sec, for example) prior to the noise-containing period. Likewise, the correlation value calculation period is, for example, a period spanning a predetermined amount of time and that is longer than the correlation value reference period (0.05 sec, for example). The waveform 3d illustrates a predicted signal generated for interpolating the audio signal in the noise-containing period using the detected pitch, and the waveform 3e illustrates a signal obtained by applying a triangular window function to the predicted signal shown in the waveform 3d. The waveform 3f likewise illustrates a signal obtained by applying a illustrated triangular window function to audio prediction result from a rear side of the noise-containing period, whereas the waveform 3g illustrates an interpolated audio signal for the noise-containing period obtained by adding the audio prediction results from before and after the noise-containing period, shown in the waveforms 3e and 3f. Hereinafter, the audio signal that precedes the occurrence of noise in terms of time will be referred to as being on "forward", whereas the audio signal that follows the occurrence of noise in terms of time will be referred to as being on "backward".

In the prediction process, first, the audio signal processing circuit 137 detects the noise-containing period shown in the waveform 3a using the accelerometer 120 or the like, and discards a signal of the detected noise-containing period. Note that the noise-containing period may be detected by analyzing the frequency of the input signal and comparing that frequency with a predetermined characteristic frequency component of the driving noise. Alternatively, the noise-containing period may be detected by obtaining the timing at which a driving command has been issued to the imaging lens driver.

Next, the audio signal processing circuit 137 detects a repetition pitch from the correlation value of the signal immediately before the noise-containing period. As shown in the waveform 3a, if a short time span in the audio signal is examined, it can be seen that the signal has a comparatively high cyclic quality. This cyclic quality is exploited in order to create the predicted signal for the noise-containing period, by making multiple copies of the audio signal from immediately before the noise-containing period. When the correlation value is calculated from the signal in the correlation value reference period and the signal in the correlation value calculation period shown in the waveform 3a, a location (length of time) in the audio signal from immediately before the noise-containing period to where the correlation value is the highest is taken as the repetition pitch in the audio. However, it is clear that the correlation value is highest at a location where the correlation value reference period is synchronized timewise with the correlation value calculation period. Accordingly, in the present embodiment, in order to exclude this value, the maximum value of the correlation value is found from a correlation maximum value search period, shown in the waveform 3c, that is distanced from the noise-containing period by a length equivalent to a threshold pitch interval. The threshold pitch interval may be the inverse of the maximum value of a fundamental frequency of the recorded audio. This prevents a pitch that is shorter than the repetition pitch of the audio that is to be found from being detected. For example, the fundamental frequency of a Japanese person's speech is approximately up to 400 Hz, and thus the threshold pitch interval may be set to 2.5 msec.

Next, the audio signal processing circuit 137 generates a first predicted signal by making multiple copies of the audio signal in the detected pitch period until the end of a prediction period (the noise-containing period), as shown in the waveform 3d. This first predicted signal will be referred to as a "forward unwindowed predicted signal". Next, as shown in the waveform 3e, a forward predicted signal is created by applying a triangular window function to the created forward unwindowed predicted signal. The predicted signal at this stage will be referred to as a "forward windowed predicted signal". In the case where a data number in the prediction period is N+1 points, and the data immediately after the start of prediction is n=0, the window function wf(t) is expressed as wf(n)=(N−n)/N.

The audio signal processing circuit 137 then executes pitch detection in the period immediately after the noise-containing period in the same manner as described above, and generates a second predicted signal by making multiple copies of the audio signal in the detected pitch period until the start of the prediction period. This second predicted signal will be referred to as a "backward unwindowed predicted signal". Next, as shown in FIG. 3F, a backward predicted signal (a backward windowed predicted signal) is created by applying, to the backward unwindowed predicted signal, a triangular window function facing the opposite direction as the window function shown in the bottom of the waveform 3e. The triangular window function wr(n) applied to the backward unwindowed predicted signal is symmetrical to that used on the forward segment, and is expressed as wr(n)=n/N.

The audio signal processing circuit 137 then generates an interpolated signal by adding the backward windowed predicted signal and the forward windowed predicted signal. The audio signal processing circuit 137 then reduces the noise by replacing the audio signal in the noise-containing period with the interpolated signal. The waveform 3g illustrates an example of the resulting signal waveform. As shown here, the interpolated signal is created by crossfading the first predicted signal and the second predicted signal. Crossfading the signals in this manner makes it possible to smoothly connect the audio between where the forward predicted signal and the area immediately following the noise-containing period connect and the backward predicted signal and the area immediately before the noise-containing period connect. Although the foregoing describes generating the predicted signals using the audio signals in the periods immediately before and after the noise-containing period, it should be noted that the present embodiment is not limited to "immediately before" and "immediately after". For example, a predicted signal may be generated using an audio signal from 0.01 sec before to 0.11 sec before the noise-containing period, and a predicted signal may be generated using an audio signal from 0.01 sec after to 0.11 after the noise-containing period.

The waveforms 3a-3g illustrate an example in which driving noise is mixed in when a woman is making the sound "ah". The following will describe a case where a similar prediction process is carried out on a different audio signal.

Figure 4:
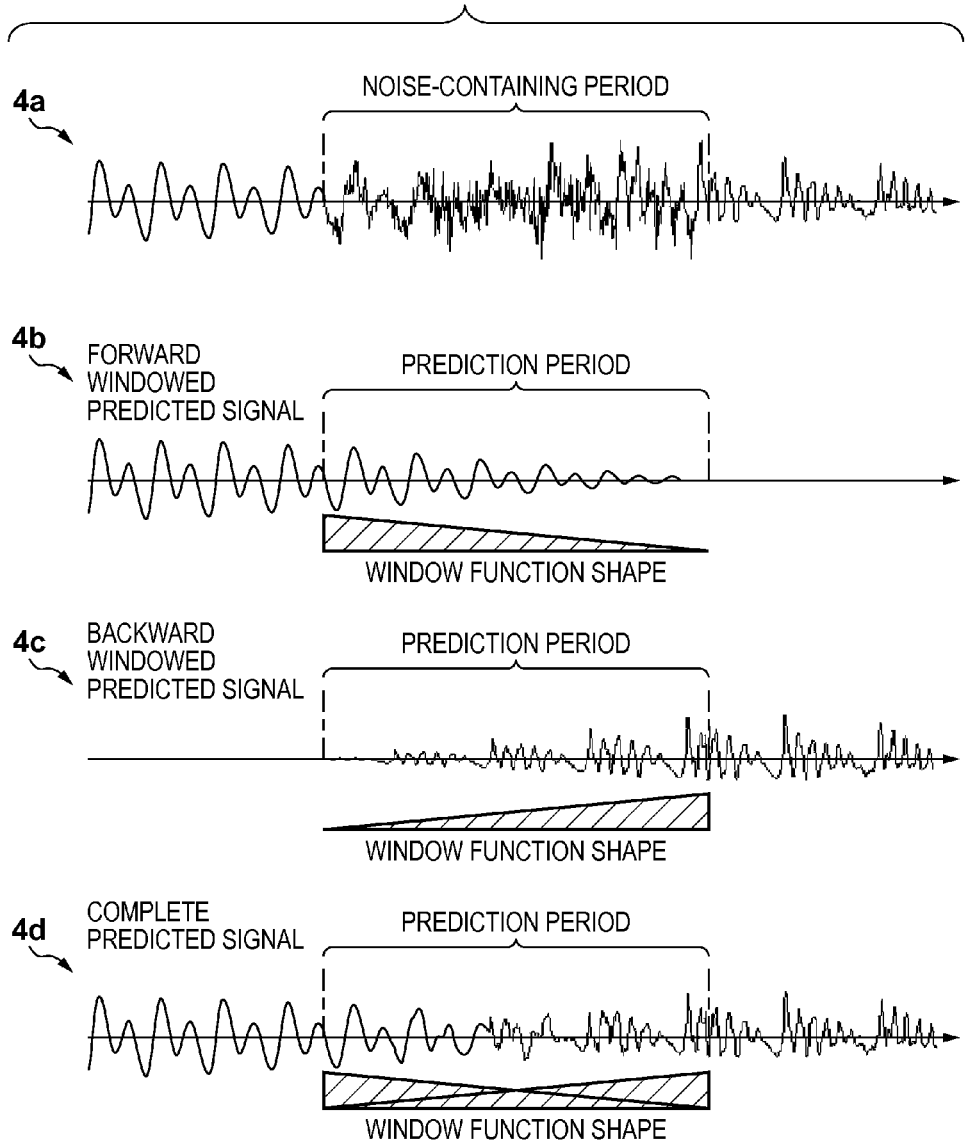
FIG. 4 is a schematic diagram illustrating a predicted signal in the conventional audio prediction process.

FIG. 4 illustrates an example in which driving noise is mixed in with an audio signal produced when a man is making the sound "oda". As in FIG. 3, the horizontal axis represents time and the vertical axis represents the signal level. In a waveform 4a in FIG. 4, it can be seen that driving noise is mixed in between two syllables, namely "oh" and "da". A waveform 4b illustrates a windowed predicted signal obtained through prediction using the audio signal from immediately before the noise-containing period, whereas a waveform 4c illustrates a windowed predicted signal obtained through prediction using the audio signal immediately after the noise-containing period. A waveform 4d illustrates a complete predicted signal (interpolated signal) obtained by adding the signals in the waveforms 4b and 4c. However, when the audio that has performed noise reduction processing using the prediction process is listened to, the phonemes /o/ and /d/ will intermix within the prediction period, resulting in a muddy and unnatural sound. As the length of the noise-containing period increases, the slope of the triangular window function applied to the unwindowed predicted signal will decrease; as a result, the two phonemes will intermix further and the unnaturalness of the sound will increase.

Accordingly, in the present embodiment, it is determined whether or not the sound changes between before and after the noise-containing period, and the method of calculating the complete predicted signal is changed in the case where the sound changes between before and after the noise-containing period. Specifically, a correlation value is calculated for the audio signal before and after the noise-containing period, and the difference/similarity between the phonemes before and after the noise-containing period is determined based on the correlation value. The method of generating the interpolated signal is then controlled in accordance with a result of the determination. Specifically, in the case where the phonemes before and after the noise-containing period are different, the window function applied to the unwindowed predicted signal predicted through the pitch detection is adjusted. This makes it difficult for different phonemes to mix together and thus realizes noise reduction processing that creates a less unnatural sound.

Figure 5:
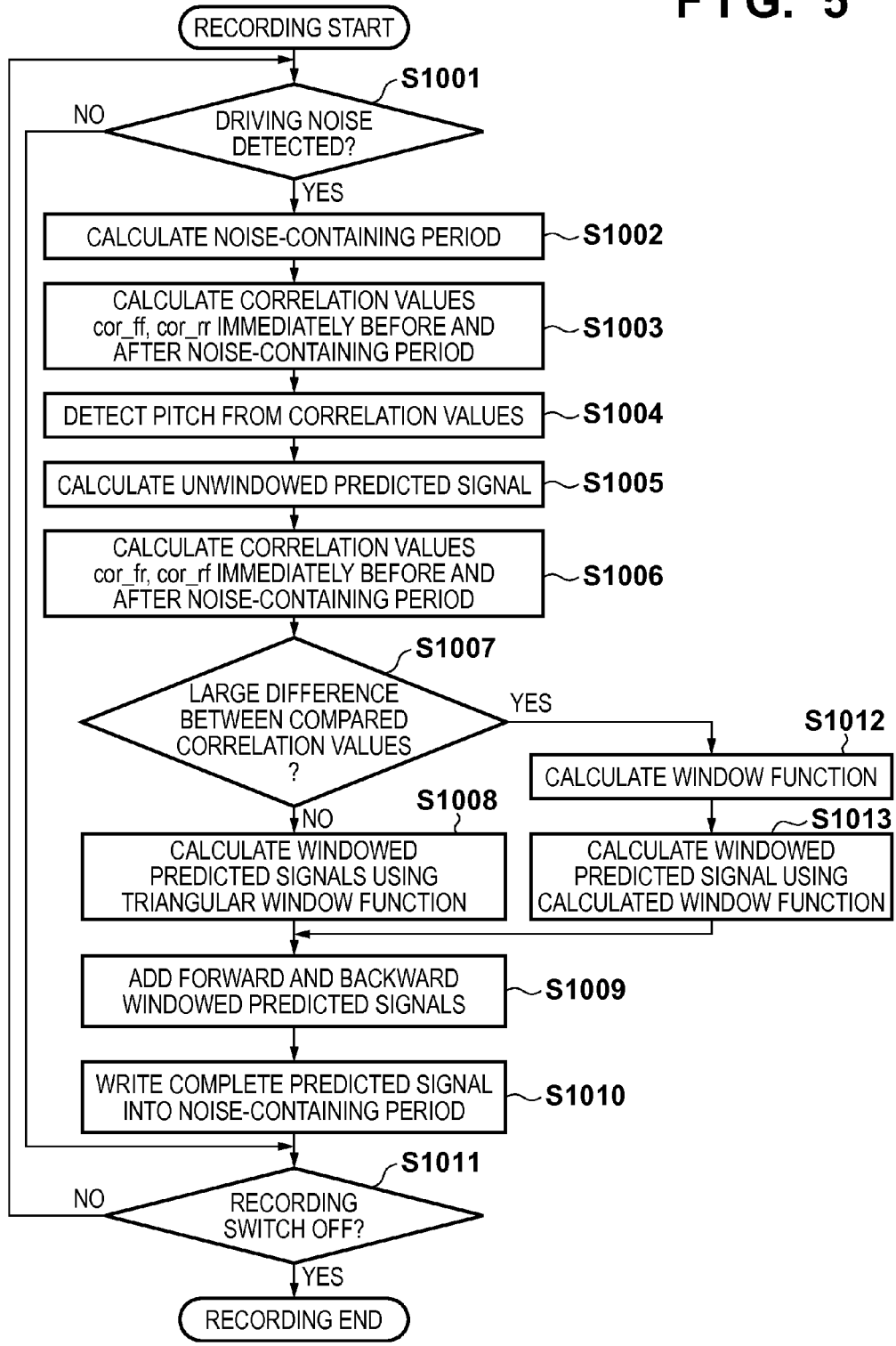
FIG. 5 is a flowchart illustrating recording operations according to the first embodiment.
Figure 6:
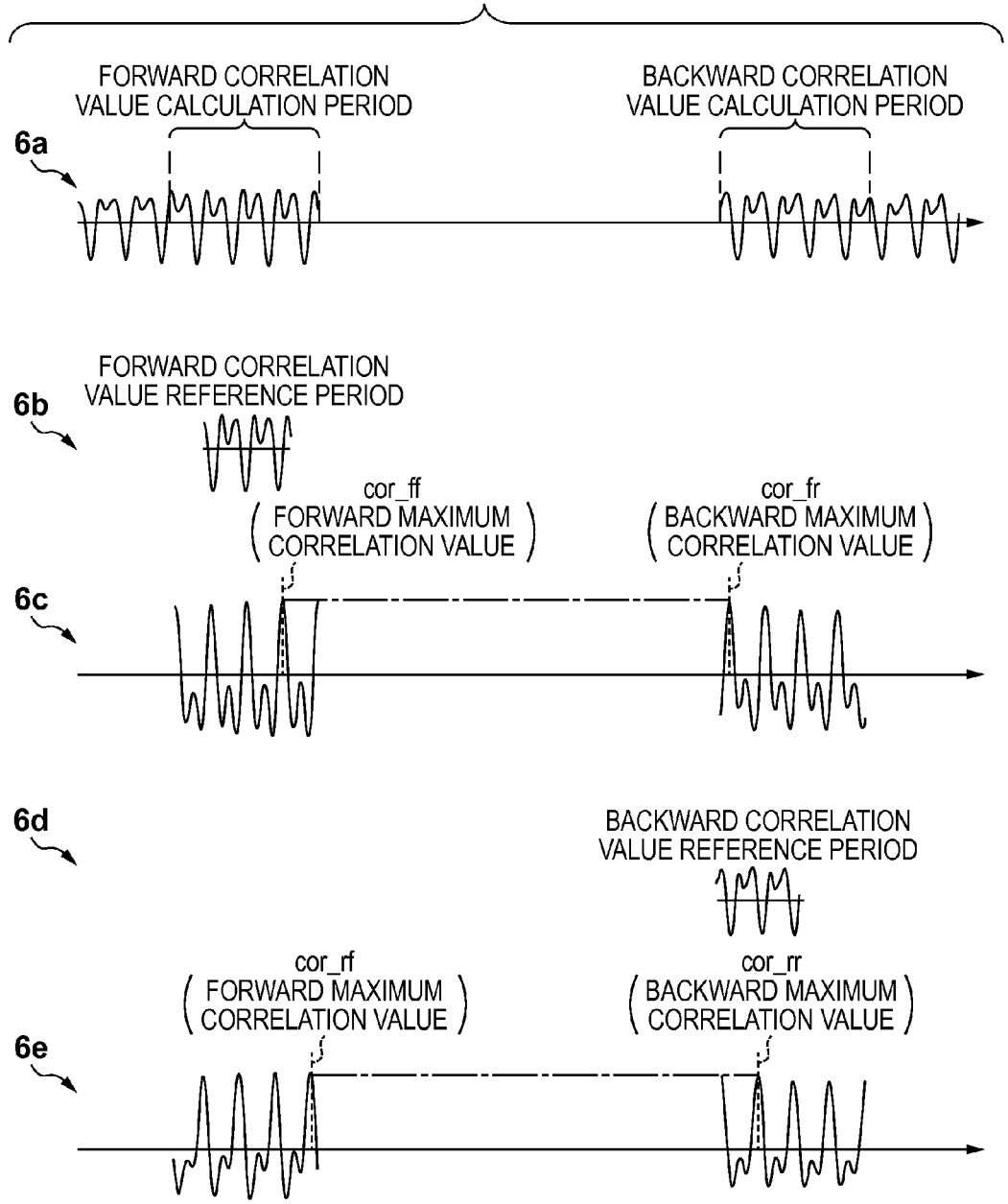
FIG. 6 is a schematic diagram illustrating audio signals and correlation values according to the first embodiment.
Figure 7:
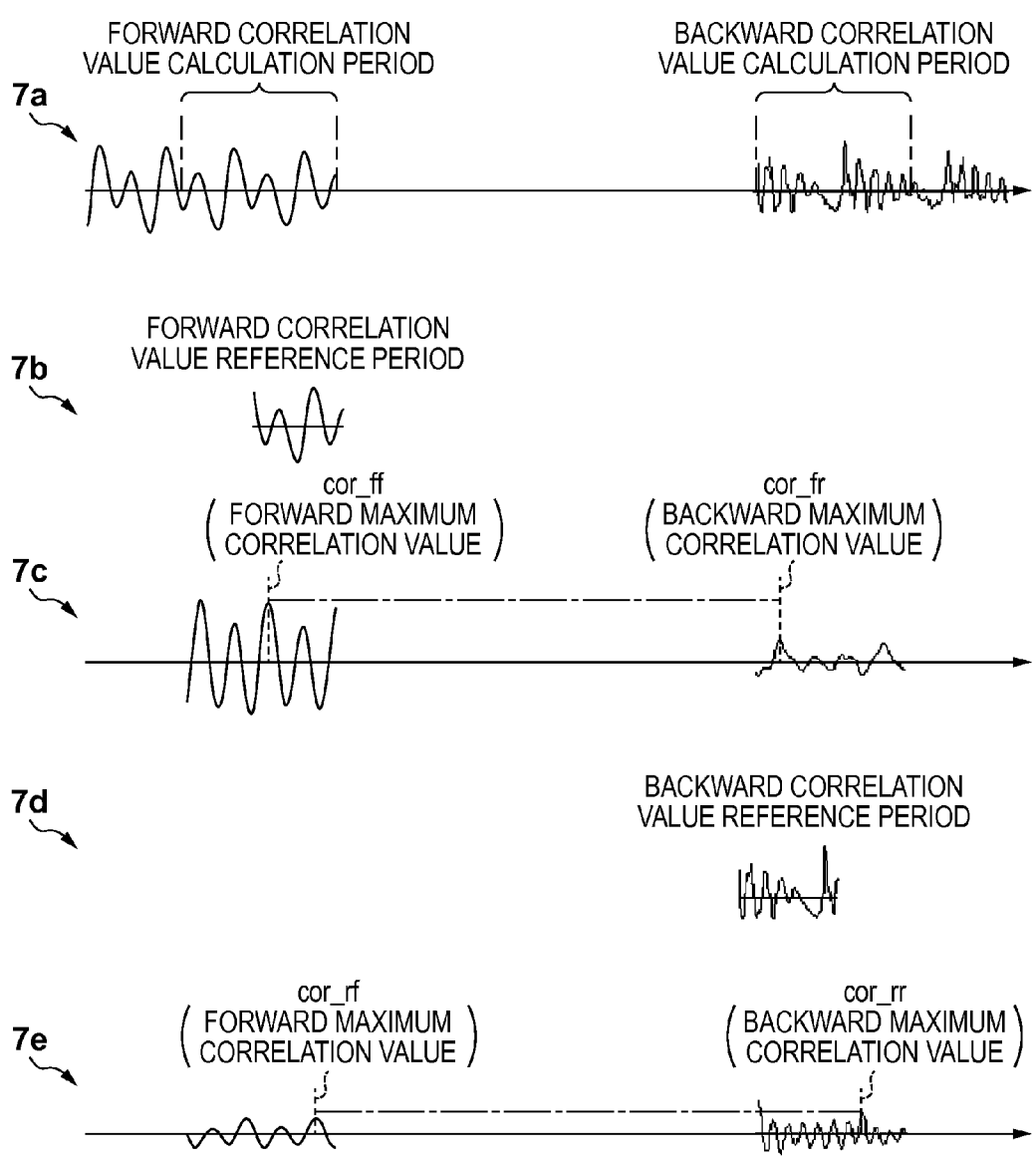
FIG. 7 is a schematic diagram illustrating audio signals and correlation values according to the first embodiment.

The noise reduction processing according to the present embodiment will now be described with reference to FIGS. 5 to 7. FIG. 5 is a flowchart illustrating recording operations that include the noise reduction processing according to the present embodiment. As described above, in the present embodiment, audio is recorded in synchronization with the signal of the optical image of the subject during video recording. When the recording starts, the camera control unit 119 determines whether or not driving noise has been detected by the accelerometer 120 (S1001). Note that rather than using the accelerometer 120, it may be determined that driving noise has been detected when a lens driving command has been issued. The process advances to S1010 in the case where driving noise is not detected in S1001, and the process returns to S1001 and repeats until a video capturing switch is turned off (in other words, until a recording switch is turned off). However, in the case where driving noise has been detected in S1001, the camera control unit 119 analyzes the output signal of the accelerometer 120 until the driving noise stops, and calculates the noise-containing period (S1002). The audio signal from the noise-containing period is discarded at this time. If the noise that has mixed in is driving noise produced by lens driving, the noise-containing period can be roughly detected by monitoring the timing of the lens driving command issued from the camera control unit 119. However, the noise removal performance will drop if the detected noise-containing period is different from the actual noise-containing period. Accordingly, in the present embodiment, the noise-containing period is precisely detected by detecting vibrations in the camera body 101, produced by lens driving, using the accelerometer 120.

Next, the audio signal processing circuit 137 finds the correlation value using the audio signals from immediately before and immediately after the noise-containing period, as illustrated in the waveforms 3a-3c in FIG. 3 (S1003). Here, a maximum value of the correlation value found from a forward reference period and a forward calculation period is taken as cor_ff (a first maximum value). Likewise, a maximum value of the correlation value found from a backward reference period and a backward calculation period is taken as cor_rr (a second maximum value). Next, the audio signal processing circuit 137 detects the repetition pitch in the backward and forward audio signals using the interval between the maximum correlation values cor_ff and cor_rr calculated in S1003 (S1004). The audio signal processing circuit 137 then calculates the backward and forward unwindowed predicted signals using the repetition pitch detected in S1004, as indicated in the waveform 3d in FIG. 3 (S1005).

Next, the audio signal processing circuit 137 calculates a maximum correlation value cor_fr between the forward reference period and the backward calculation period, and calculates a maximum correlation value cor_rf between the backward reference period and the forward calculation period (S1006). Waveforms 6a-6e in FIG. 6 and waveforms 7a-7e in FIG. 7 illustrate examples of audio signals occurring after the audio data in the noise-containing period has been discarded, and of calculated correlation values. The waveforms 6a-6e in FIG. 6 illustrate an example in which noise mixes in while a phoneme /a/ is being produced, whereas the waveforms 7a-7e in FIG. 7 illustrate an example in which noise mixes into an area where the phoneme /d/ occurs when the sound "oda" is produced.

Referring FIG. 6, a method of calculating the maximum correlation values cor_fr and cor_rf will be described. A waveform 6a illustrates audio signals in the forward calculation period (a first calculation period) and the backward calculation period (a second calculation period). A waveform 6b illustrates an audio signal in the forward reference period (a first reference period), whereas a waveform 6d illustrates an audio signal in the backward reference period (a second reference period). The audio signal processing circuit 137 calculates a correlation value for the audio signal in the backward calculation period relative to the audio signal in the forward reference period. A waveform 6c illustrates an example of the correlation value calculated at this time. The waveform 6c also shows the correlation value found in S1003, for descriptive purposes. The audio signal processing circuit 137 calculates the maximum correlation value at this time as cor_fr (a third maximum value). Likewise, the audio signal processing circuit 137 calculates a correlation value for the audio signal in the forward calculation period relative to the audio signal in the backward reference period. A waveform 6e illustrates an example of the correlation value calculated at this time. The waveform 6e also shows the correlation value found in S1003, for descriptive purposes. The audio signal processing circuit 137 calculates the maximum correlation value at this time as cor_rf (a fourth maximum value).

Next, the audio signal processing circuit 137 determines whether or not the phonemes before and after the noise-containing period are different, using cor_ff and cor_rr calculated in S1003 and cor_fr and cor_rf calculated in S1006. If the phonemes before and after the noise-containing period are the same, the correlation of the audio signal in the noise-containing period is high. In other words, the values of cor_ff and cor_fr are essentially equal, and the values of cor_rr and cor_rf are also essentially equal. In the waveform 6c, it can be seen that the values of cor_ff and cor_fr are essentially equal, while in the waveform 6e, it can be seen that the values of cor_rr and cor_rf are also essentially equal. Accordingly, in S1007, the audio signal processing circuit 137 determines that the phonemes before and after the noise-containing period are the same when the following Formulas (1) and (2) hold true, using a correlation threshold α (where α is a positive number).

$$1/\alpha \leq cor\_fr/cor\_ff \leq \alpha \qquad (1)$$

$$1/\alpha \leq cor\_rf/cor\_rr \leq \alpha \qquad (2)$$

Formula (1) is a conditional expression specifying that a ratio of the first maximum value (cor_ff) to the third maximum value (cor_fr) is within a predetermined range. Likewise, Formula (2) is a conditional expression specifying that a ratio of the second maximum value (cor_rr) to the fourth maximum value (cor_rf) is within a predetermined range. When Formulas (1) and (2) hold true in S1007, it is determined that the phonemes before and after the noise-containing period are the same, and the process advances to S1008. In S1008, the audio signal processing circuit 137 applies triangular window functions to the corresponding backward and forward unwindowed predicted signals found in S1005, and calculates the backward and forward windowed predicted signals (S1008). The audio signal processing circuit 137 then generates the complete predicted signal (the interpolated signal) by adding the calculated backward and forward windowed predicted signals (S1009). The process then advances to S1010.

Next, referring FIG. 7, a case where the phonemes before and after the noise-containing period are different will be described. As described above, waveforms 7a-7e illustrate an example in which noise mixes into an area where the phoneme /d/ occurs when the sound "oda" is produced, where the phoneme prior to the noise-containing period is /o/ and the phoneme following the noise-containing period has changed to /a/. In this case, as indicated in a waveform 7e, there is no major difference between cor_rf and cor_rr, but as indicated in a waveform 7c, there is a major difference between the values of cor_ff and cor_fr. In the case where the aforementioned Formulas (1) and (2) do not hold true in S1007, it is determined that the phonemes before and after the noise-containing period are different, and the process advances to S1012.

In S1012, the audio signal processing circuit 137 changes the window function to a function with which the interpolated signal will sound less unnatural upon listening. The window function changed here is calculated as follows, for example. Assuming a data number in the noise-containing period is N+1 and the first location in the noise-containing period is n=0, a forward window function wf and a backward window function wr are expressed through the following formulas.

$$Wf(n) = \begin{cases} (N \cdot Kn - n)/(N \cdot Kn) & (n \leq N \cdot Kn) \\ 0 & (n > N \cdot Kn) \end{cases}$$

$$Wf(n) = \begin{cases} (n - N + N \cdot Kn)/(N \cdot Kn) & (n \geq 1 - N \cdot Kn) \\ 0 & (n < 1 - N \cdot Kn) \end{cases}$$

$$Wr(n) = (n - N + N \cdot Kn)/N \cdot Kn$$

Here, a coefficient Kn is 0<Kn<1.

Figure 8:
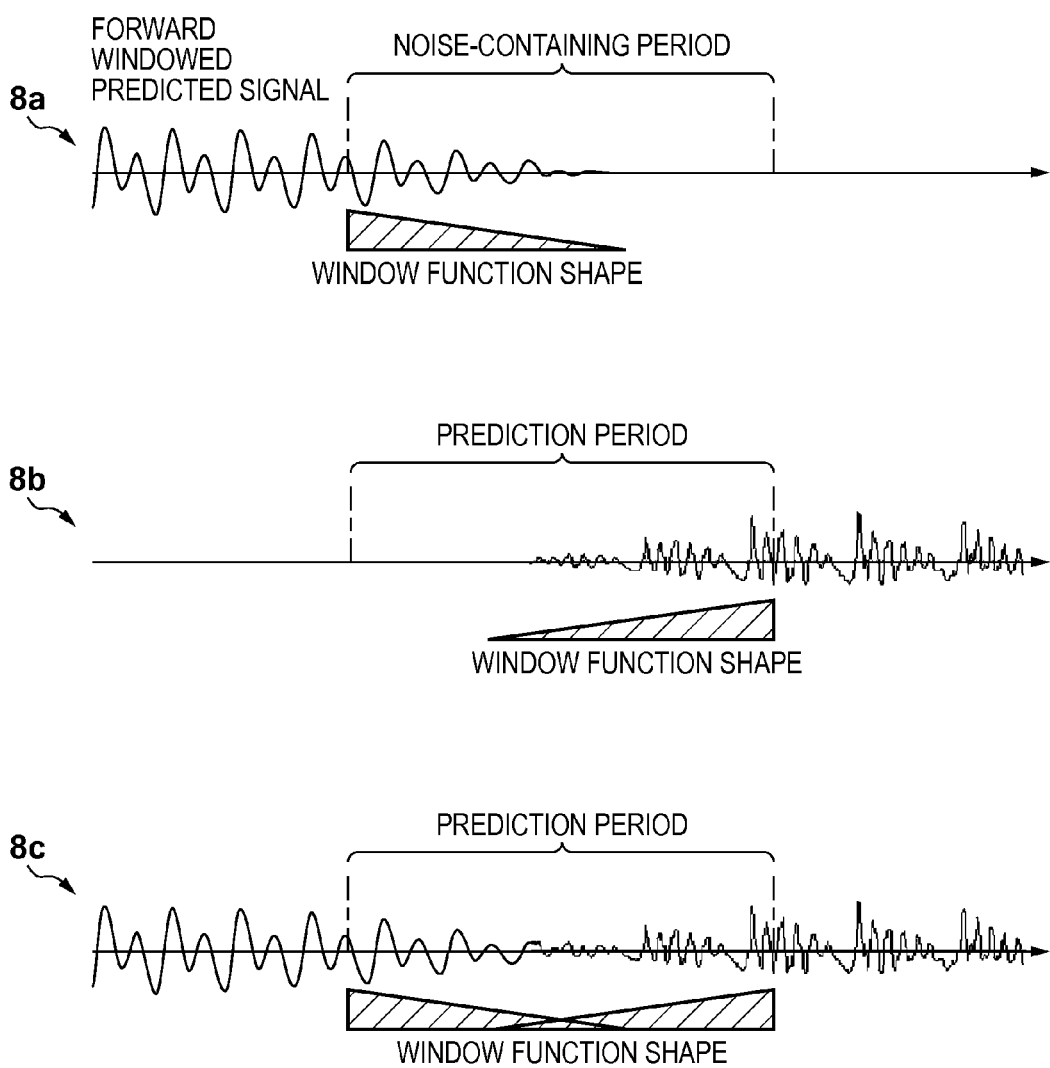
FIG. 8 is a schematic diagram illustrating a predicted audio signal according to the first embodiment.

Next, the audio signal processing circuit 137 applies the window function changed in S1012 to the unwindowed predicted signal generated in S1005 and calculates a windowed predicted signal, as shown in waveforms 8a and 8b in FIG. 8 (S1013). The process then advances to S1009, where the audio signal processing circuit 137 generates the complete predicted signal (the interpolated signal) by adding the backward and forward windowed predicted signals (S1009).

As shown in a wave form 8a, the forward windowed predicted signal becomes silent prior to the end of the noise reduction period. Likewise, as shown in a waveform 8b, the backward windowed predicted signal becomes silent in the start direction in the noise removal period. As a result, when the backward and forward windowed predicted signals are added, an overlapping period is shorter than when a normal triangular window function is applied, as shown in a waveform 8c. Thus in the present embodiment, in the case where it has been determined that the phonemes before and after the noise-containing period are not the same, the window function is adjusted so as to reduce the amount of time the backward predicted signal and the forward predicted signal overlap in the crossfade. Unnatural sound caused by audio signals predicted from two different phonemes intermixing is reduced as a result.

Next, the audio signal processing circuit 137 replaces the signal in the noise-containing period with the complete predicted signal generated in S1009, and writes the resulting signal into the memory 134 (S1010). The noise reduction processing is thus completed. In S1011, whether the video capturing switch has been turned off (in other words, whether the recording switch has been turned off) is detected, and the process returns to S1001 and repeats until the recording switch has been turned off. The recording operations end when it is detected that the recording switch has been turned off.

As described thus far, according to the present embodiment, whether or not the same phonemes are present before and after the noise-containing period is determined by calculating and comparing correlation values for the audio signals before and after the noise-containing period, and the prediction process is controlled in accordance with a result of the determination. Specifically, the window function applied to the unwindowed audio signal is changed in the case where the phonemes before and after the noise-containing period are different. As a result, in the case where the audio signals before and after the noise-containing period are different, a sense of unnaturalness caused by the backward and the forward predicted signals intermixing is less likely to occur, which improves the noise removal performance.

In the present embodiment, a window function that takes the coefficient Kn as a fixed value is used when it has been determined that the phonemes before and after the noise-containing period are different. However, the coefficient Kn may be changed depending on the length of the noise-containing period. For example, the coefficient Kn may be set based on a length of time t_ns of the noise-containing period, as indicated by the following formula.

$$Kn = \begin{cases} 0.75 & (\text{t\_ns} < Tl) \\ 0.25 & (\text{t\_ns} \geq Tl) \end{cases}$$

Figure 9:
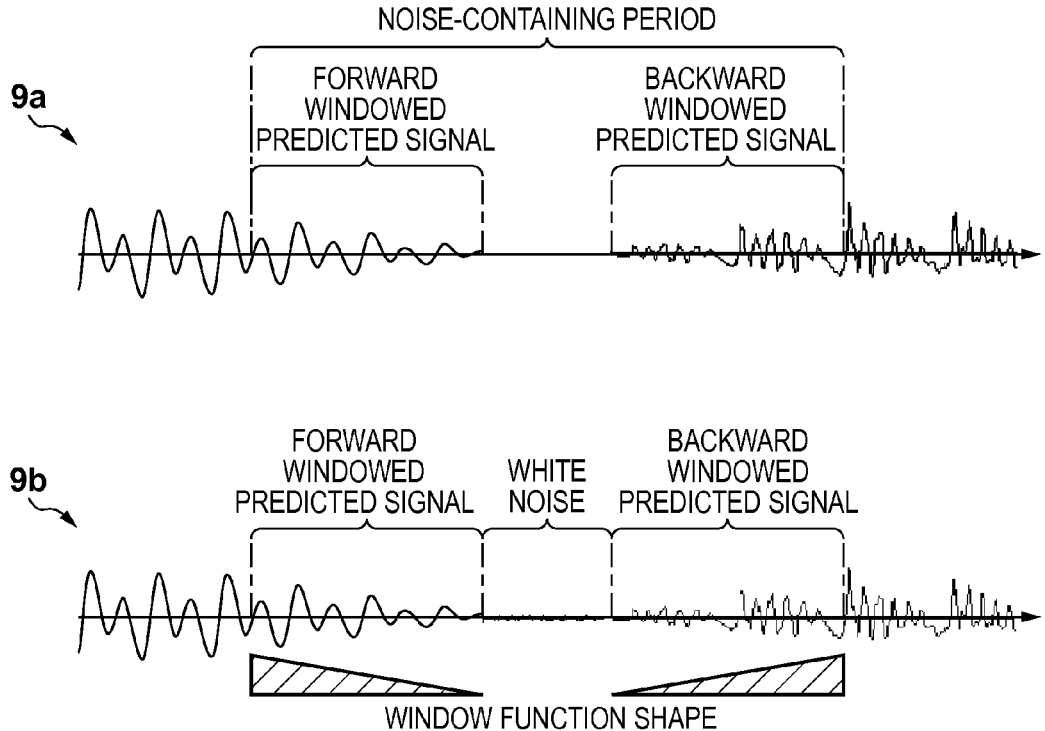
FIG. 9 is a schematic diagram illustrating a predicted audio signal according to the first embodiment.

Here, Tl is a time threshold for the noise-containing period. The performance of the prediction process drops when the noise-containing period is relatively long, and thus interpolating the entire noise-containing period with the predicted signals results in an unnatural sound. Accordingly, in the case where a noise-containing period t_ns exceeds a time threshold Tl, the backward and forward windowed predicted signals do not overlap even when those predicted signals are added together, and thus a silent period is produced, as shown in a waveform 9a in FIG. 9. As a result, a predicted signal having little unnaturalness can be generated even when the noise-containing period is relatively long. Meanwhile, in the case where the noise-containing period t_ns exceeds the time threshold Tl and a silent period has been produced in the complete predicted signal as a result of the prediction process, a noise of low level (comfort noise) may be added to the silent period (a waveform 9b). The human auditory sense is such that total silence feels unnatural when a person is listening to audio. This is particularly apparent when listening using an audio playback device that is in close contact with the ears, such as headphones. Accordingly, adding comfort noise to the silent period makes it possible to reduce the sense of unnaturalness caused by totally silent periods. The comfort noise may be white noise or pink noise.

Figure 10:
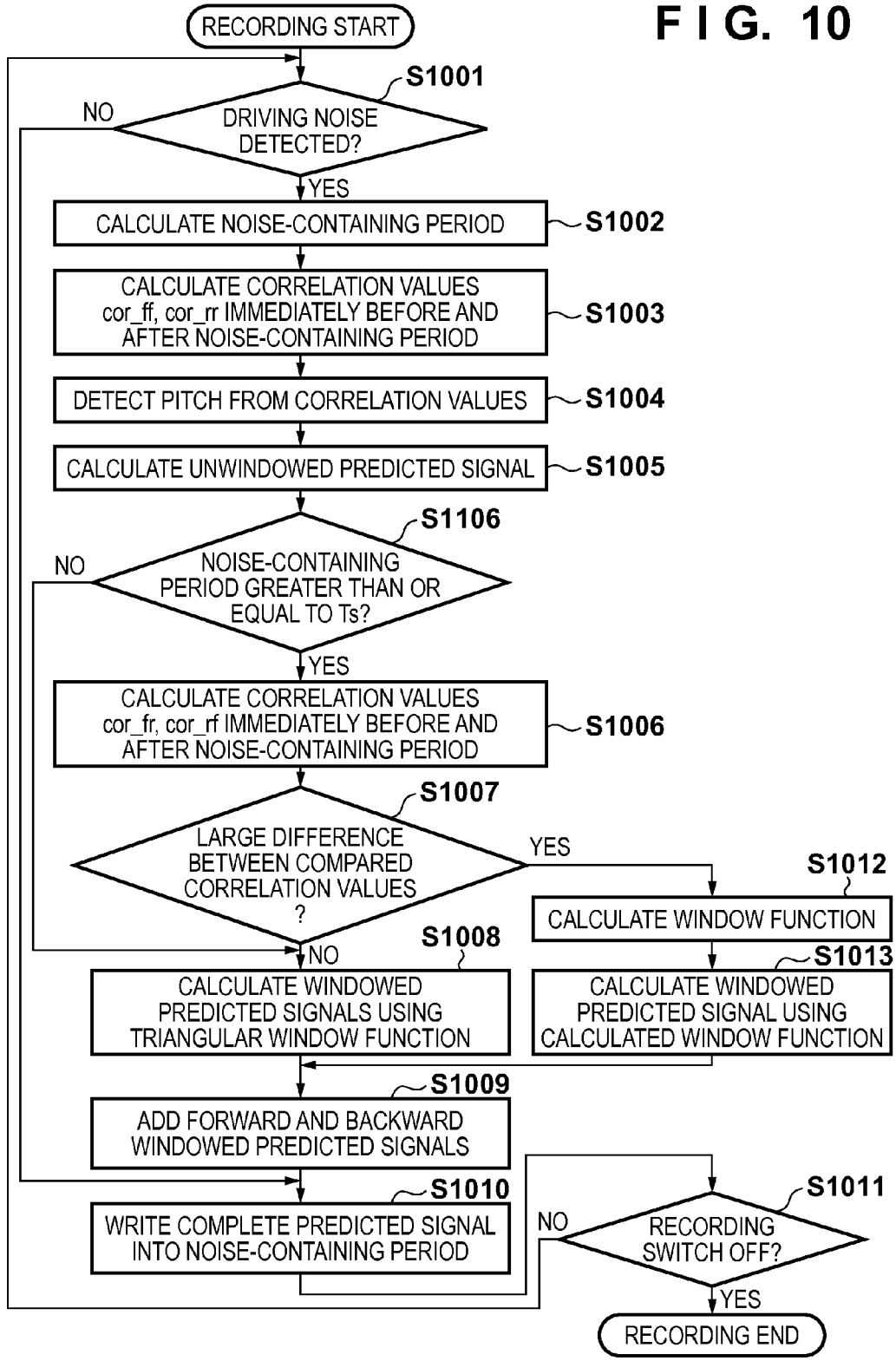
FIG. 10 is a flowchart illustrating recording operations according to a variation on the first embodiment.

Meanwhile, when the noise-containing period is extremely short, there will be little unnaturalness when the prediction process is carried out using normal triangular window functions, even in the case where there is low correlation between the audio signal before and after the noise-containing period. Furthermore, even if a complete prediction process is carried out using the window functions wf and wr described earlier, the difference from the case where a normal triangular window function is used will not be very apparent. Accordingly, whether to change the window function may be determined based on the length of the noise-containing period. This will be described using the flowchart shown in FIG. 10. In FIG. 10, processing steps that are the same as in the flow shown in FIG. 5 are given the same reference numerals, and descriptions thereof will be omitted. In the processing flow shown in FIG. 10, S1106 has been added between S1005 and S1006. In S1106, it is determined whether or not the noise-containing period t_ns is greater than or equal to a short time threshold Ts. The short time threshold is set to approximately 20 milliseconds, for example. In the case where the noise-containing period t_ns is greater than or equal to Ts, the process advances to S1007. When such is not the case, however, it is determined unnecessary to calculate a new window function, and the process advances to S1006. In this manner, when the noise-containing period t_ns is short, it is determined unnecessary to calculate a new window function in S1106, and the windowed predicted signal is then calculated without calculating a correlation value for the audio signal before and after the noise-containing period. This lightens the processing burden.

Figure 11:
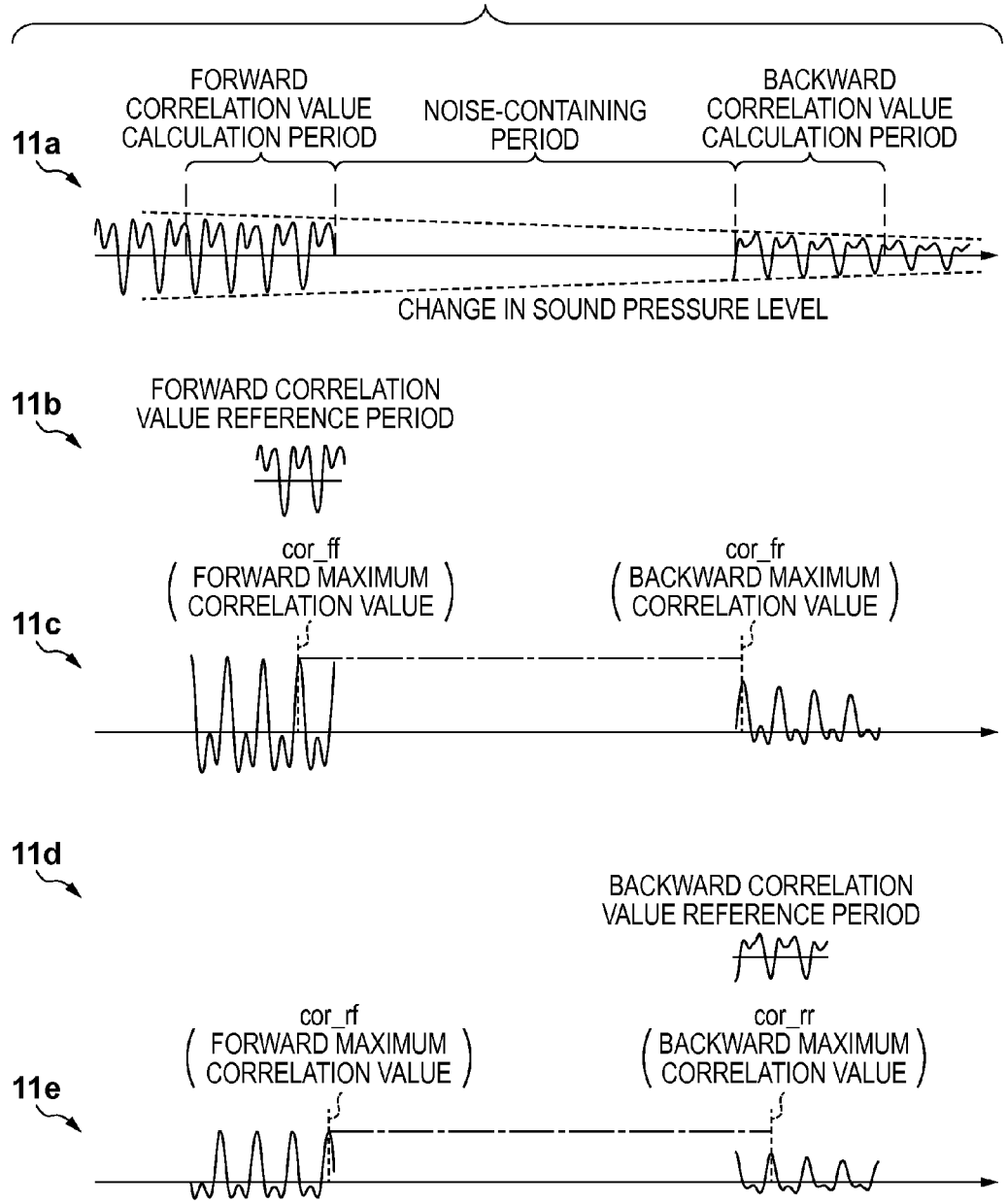
FIG. 11 is a schematic diagram illustrating pre-sound pressure correction audio signals and correlation values according to the first embodiment.

In addition, the correlation value may be found after first normalizing a sound pressure level between before and after the noise-containing period. A waveform 11a in FIG. 11 illustrates an example of an audio signal in which the same phoneme continues from before to after the noise-containing period but in which a sound pressure level gradually decreases. Waveforms 11b-11e in FIG. 11 illustrate correlation values in the same manner as the waveforms 6b-6e in FIG. 6. With an audio signal in which the same phoneme continues but the sound pressure level changes, as shown in FIG. 11, high-performance noise-removal processing is possible even if the prediction process is carried out using a normal triangular window function. However, because the sound pressure level decreases from before to after the noise-containing period, a large difference in the correlation values is produced, as shown in the waveforms 11c-11e; as a result, it will be determined that the phonemes differ between before and after the noise-containing period. Accordingly, as shown in FIG. 12, the correlation value may be calculated using an audio signal whose sound pressure level has been normalized. Through this, precise noise reduction processing can be carried out even for an audio signal in which the same phoneme continues from before to after the noise-containing period but in which a sound pressure level gradually decreases.

Meanwhile, unlike speech, musical sound signals from instrumental performances, for example, often do not have sudden changes in the sound. Accordingly, in the case where the sound has changed between before and after the noise removal period, there will be little sense of unnaturalness even if the prediction process is carried out using a normal triangular window function. Accordingly, if the image capturing apparatus has several shooting modes, such as portrait shooting, sports-scene shooting, music shooting, and so on, the window function may be changed depending on the shooting mode. For example, executing operations according to the aforementioned flowchart when an operator has set the shooting mode to the portrait mode but setting the triangular window function to the normal function without executing operations for calculating and comparing the correlation values when the shooting mode is set to music shooting can be considered. Controlling the window function in accordance with the shooting mode settings enables the noise removal processing to be executed according to the intent of the operator.

The present embodiment describes removing noise produced when a lens is driven. However, the noise removal processing can be carried out for any noise that can be detected by the accelerometer 120 and in which a noise-containing period can be detected, such as operational noise produced when the user operates an operation member such as a switch, a dial, or the like, noise produced when the operator touches the camera body, and so on.

Second Embodiment

In the aforementioned first embodiment, it is determined whether or not a phoneme has changed between before and after a noise-containing period by calculating and comparing correlation values for the audio signals occurring before and after the noise-containing period. As opposed to this, in the second embodiment, it is determined whether or not a phoneme has changed by comparing the sound pressure levels of the audio signals occurring before and after the noise-containing period. Although comparing sound pressure levels offers a less precise determination regarding phoneme changes than comparing correlation values, doing so can greatly reduce the processing burden as compared to when calculating correlation values.

Figure 13:
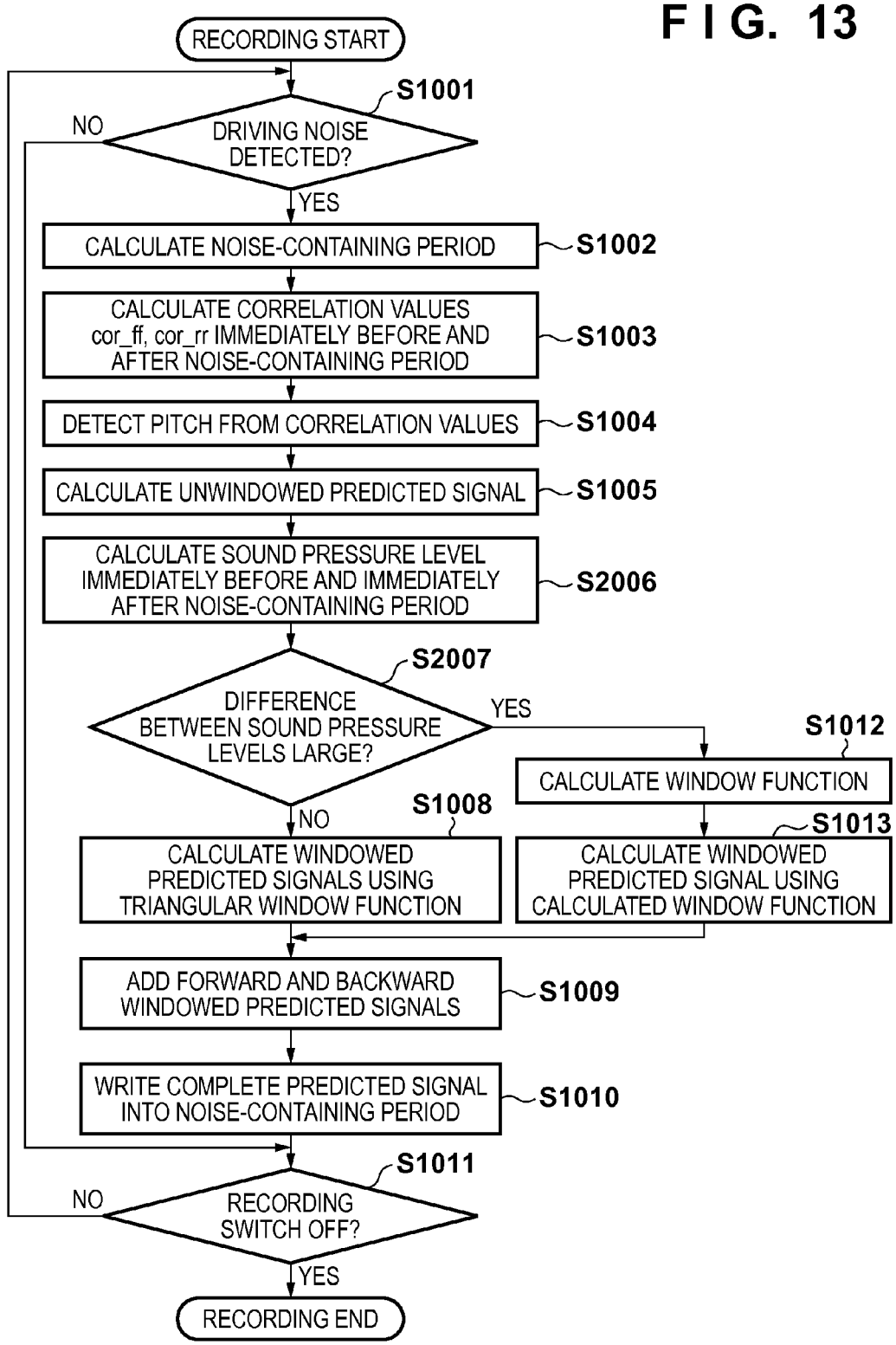
FIG. 13 is a flowchart illustrating recording operations according to a second embodiment.

FIG. 13 is a flowchart illustrating recording operations according to the present embodiment. Processing steps that are the same as in the flow shown in FIG. 5 are given the same reference numerals, and descriptions thereof will be omitted. In the processing flow shown in FIGS. 13, S2006 and S2007 are executed in place of S1006 and S1007 shown in FIG. 5. In S2006, the audio signal processing circuit 137 calculates sound pressure levels before and after the noise-containing period. FIG. 14 is a diagram illustrating the calculation of sound pressure levels in audio signals in which the phonemes differ between before and after the noise-containing period. Here, for example, a maximum value and a minimum value are detected in audio signals found in sound pressure level comparison periods immediately before and immediately after the noise-containing period.

Next, in S2007, the audio signal processing circuit 137 compares the sound pressure levels before and after the noise-containing period, calculated in S2006. It is determined that there is no change in the phonemes between before and after the noise-containing period in the case where a difference between the compared sound pressure levels is within a predetermined range, after which the process advances to S1008. However, it is determined that the phonemes have changed between before and after the noise-containing period in the case where the difference between the sound pressure levels exceeds the predetermined range, after which the process advances to S1012.

In this manner, according to the second embodiment, it is determined whether a phoneme has changed by comparing the sound pressure levels of the audio signals occurring before and after the noise-containing period. As a result, although the determination as to whether the phoneme has changed is less precise than when calculating and comparing correlation values, the processing burden can be greatly reduced.

Third Embodiment

Figure 15:
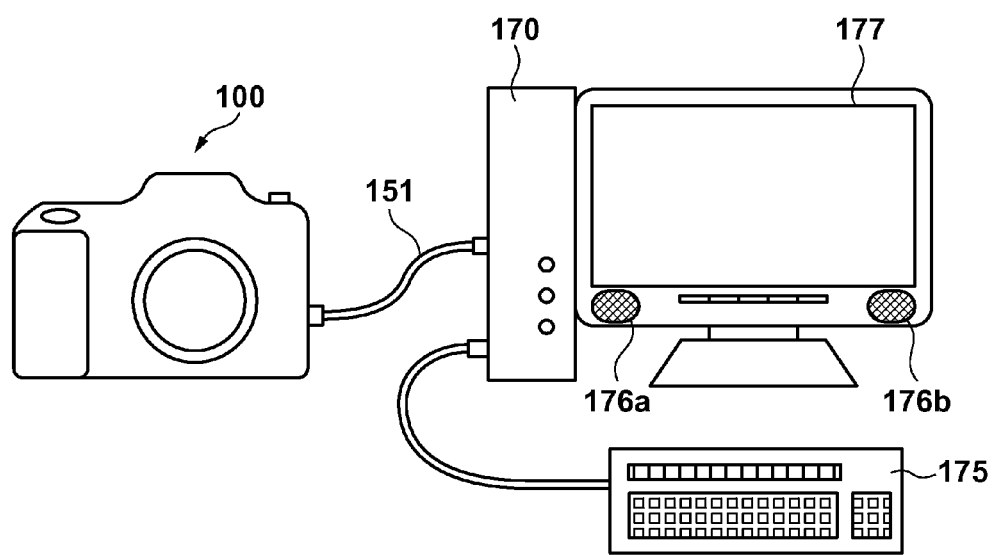
FIG. 15 is a block diagram illustrating a signal processing system including a single-lens reflex digital camera and an information processing apparatus according to a third embodiment.

FIG. 15 is a diagram illustrating a system including a single-lens reflex digital camera and an information processing apparatus according to a third embodiment, and illustrates a state in which the single-lens reflex digital camera 100 and an information processing apparatus 170 are connected by a communication cable 151. FIG. 16 is a block diagram illustrating the single-lens reflex digital camera 100 and the information processing apparatus 170. A communication connector 141 for communicating with an external device is provided in the camera body 101 of the single-lens reflex digital camera 100 according to the present embodiment. This communication connector 141 is connected to a communication connector 174 in the information processing apparatus 170 via the communication cable 151. In FIGS. 13 and 14, constituent elements identical to those described in the first embodiment are given the same reference numerals, and descriptions thereof will be omitted.

The information processing apparatus 170 includes a control unit 171, an audio signal processing circuit 172, a memory 173, an operation input unit 175, an audio playback device 176, and a display device 177. The control unit 171 receives, via the communication connector 174, recorded video data containing an audio signal that has been recorded into the memory 134 in the camera body 101. The audio signal processing circuit 172 executes noise removal processing on that audio signal. The signal obtained as a result of the noise removal processing is recorded into the memory 173.

In the present embodiment, an audio signal on which the noise removal processing has not been carried out and that therefore contains driving noise is recorded into the memory 173 along with information of a noise-containing period (that is, the timing of the noise-containing period), which is a result of detection performed by a noise period detection unit and is synchronized with the audio signal. The noise removal process is carried out based on a command signal from the operation input unit 175 in response to an operation performed by an operator, and the progress of the noise removal process is output to the audio playback device 176 and the display device 177.

Lens driving operations and operations performed in the noise removal process according to the present embodiment will be described using FIGS. 17 and 18.

Figure 17:
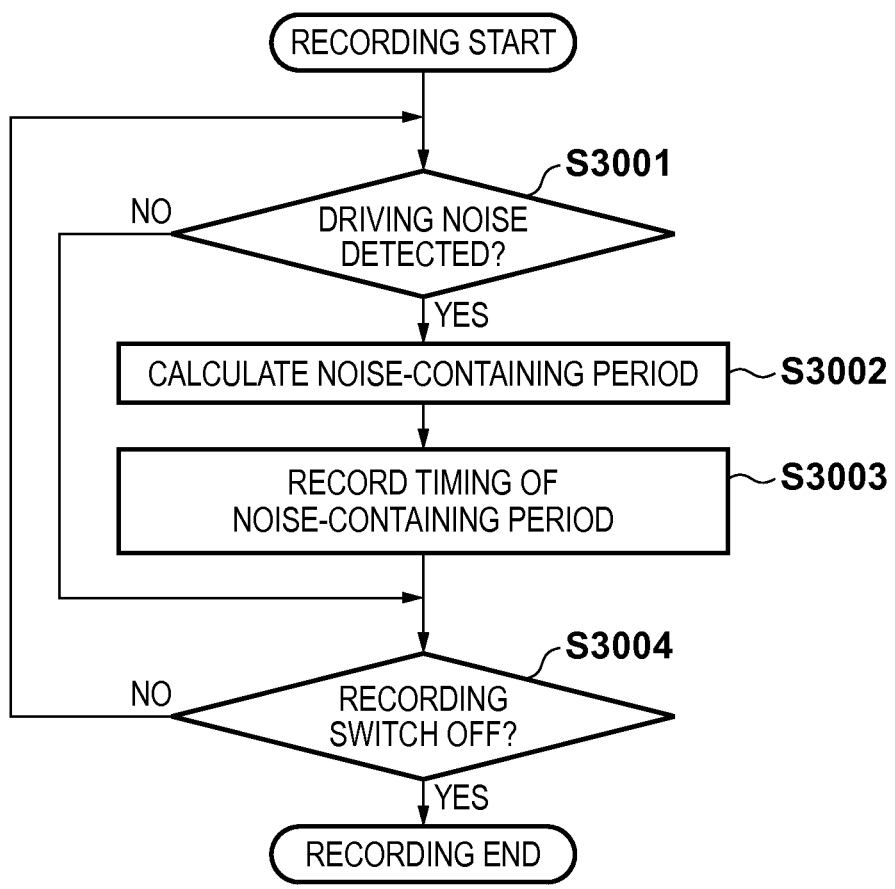
FIG. 17 is a flowchart illustrating camera-side operations according to the third embodiment.

FIG. 17 is a flowchart illustrating lens driving operations and audio recording carried out in the camera, according to the present embodiment. Recording operations commence when a video shooting switch (that is, a recording switch) is turned on. In S3001, the camera control unit 119 detects driving noise using the accelerometer 120. In the case where no driving noise is detected, the process advances to S3004, and the process returns to S3001 and repeats until the video shooting switch (the recording switch) has been turned off. On the other hand, in the case where driving noise is detected in S3001, the process advances to S3002, where the camera control unit 119 calculates the noise-containing period by analyzing the output signal of the accelerometer 120. The camera control unit 119 then records the timing of the calculated noise-containing period into the memory 134 in synchronization with the audio signal (S3003).

Next, a noise removal process performed by the information processing apparatus 170 when the single-lens reflex digital camera 100 and the information processing apparatus 170 are connected by the communication cable 151 will be described using FIG. 15.

Figure 18:
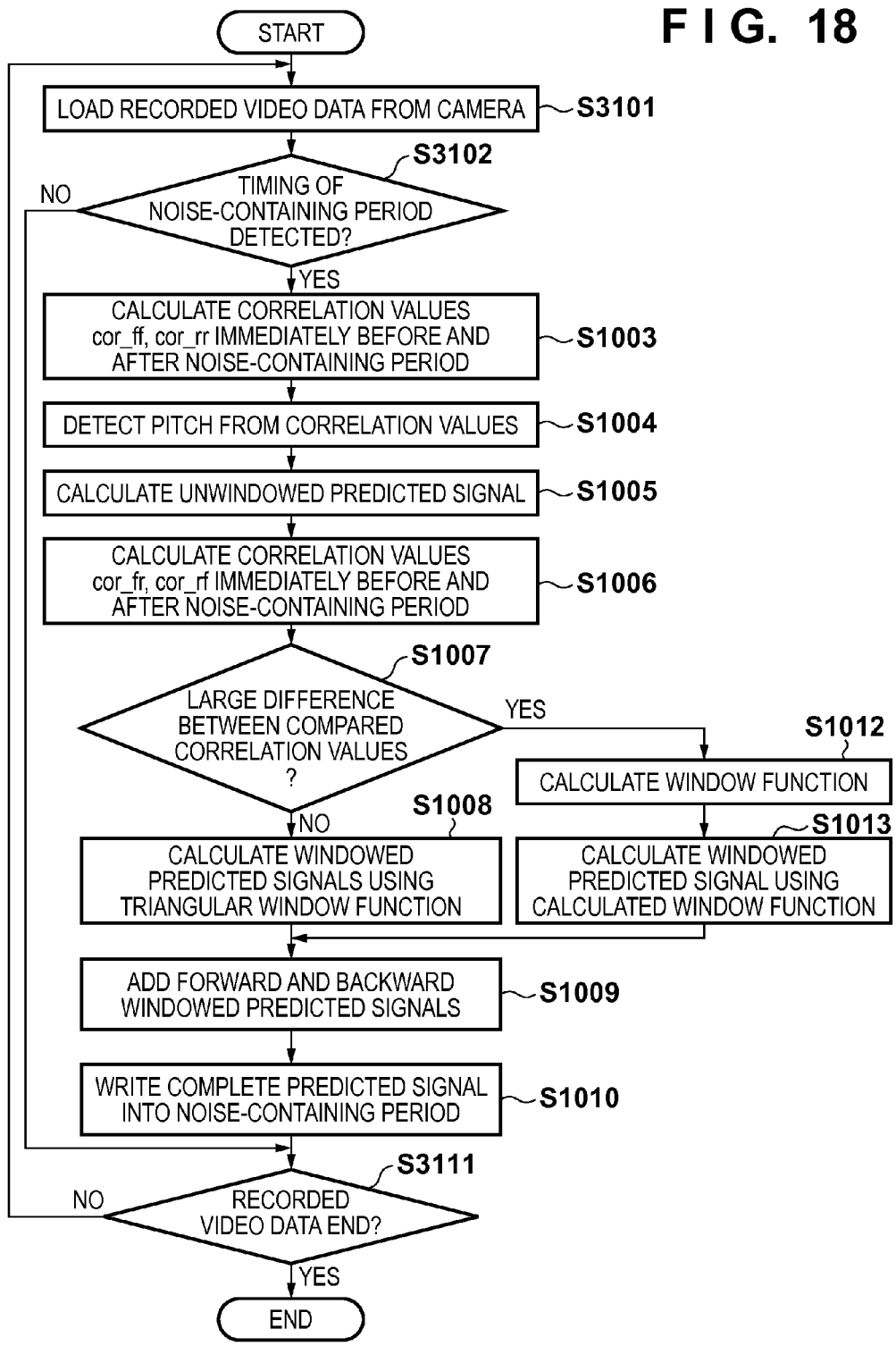
FIG. 18 is a flowchart illustrating information processing apparatus-side operations according to the third embodiment.

When a command to execute the noise removal process is input through the operation input unit 175, the processes in the flowchart shown in FIG. 18 are started by the single-lens reflex digital camera 100 and the information processing apparatus 170. First, the control unit 171 in the information processing apparatus 170 loads the recorded video data recorded into the memory 134 in the camera body 101, which contains the audio signal in which driving noise is present and a record of the noise-containing period timing, via the communication cable 151 (S3101). Then, in S3102, the control unit 171 determines whether or not the timing of the noise-containing period is present in the recorded video data. The process advances to S3111 in the case where the timing of the noise-containing period is not present. On the other hand, the process advances to S1003 in the case where a record of the timing of the noise-containing period is detected, after which the control unit 171 executes the processes up to S1013 in the same manner as described in the first embodiment.

In S3111, the control unit 171 detects the end of the recorded video data that has been loaded. The process returns to S3101 and repeats until the end of the recorded video data has been detected. The process ends when the end of the recorded video data has been detected.

Figure 19:
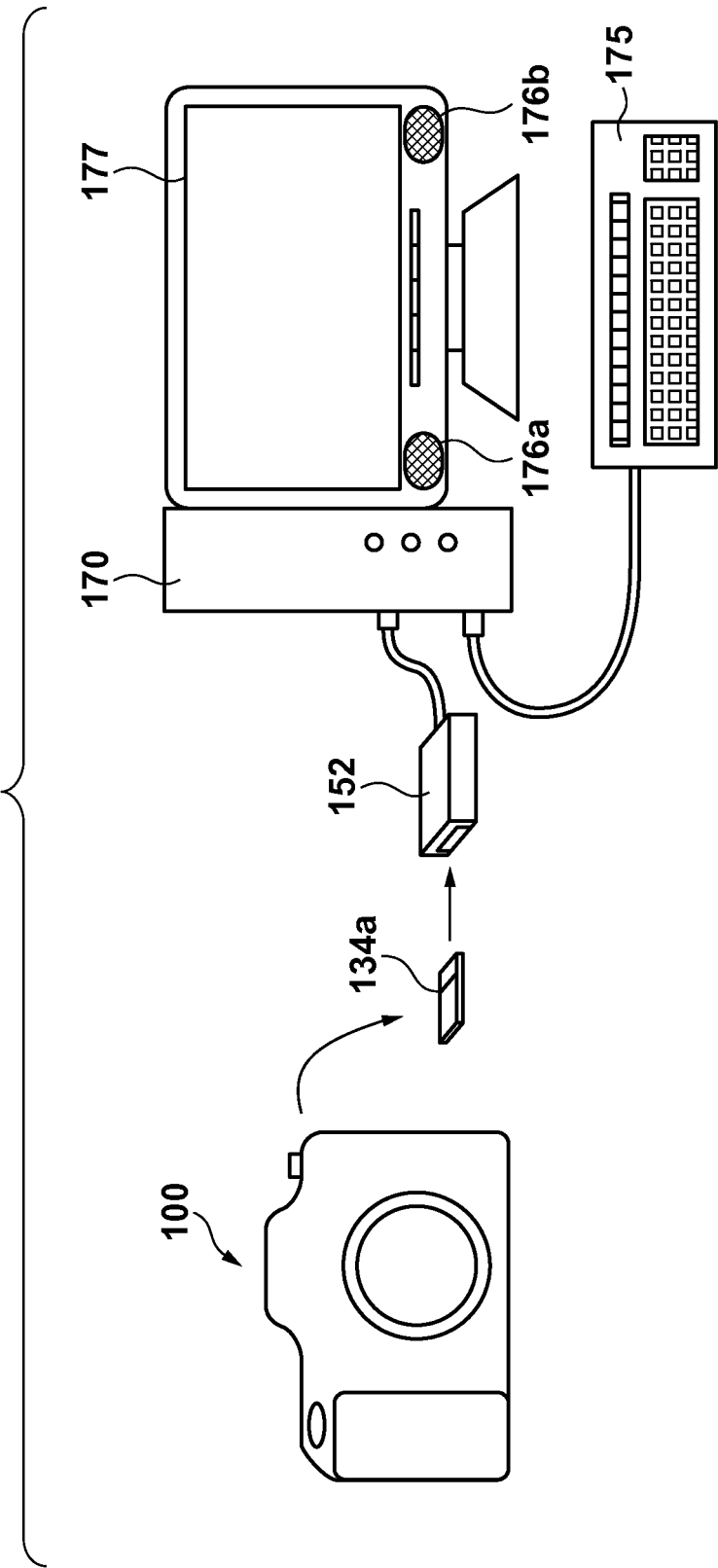
FIG. 19 is a diagram illustrating the configuration of a system according to a variation on the signal processing system.

The aforementioned example describes a system in which the single-lens reflex digital camera 100 and the information processing apparatus 170 are electrically connected by the communication cable 151, as illustrated in FIG. 15. FIG. 19 illustrates a modified embodiment with regard to the configuration shown in FIG. 15. In the configuration shown in FIG. 19, the memory 134 of the single-lens reflex digital camera 100, into which the recorded video data is recorded, has been replaced by a memory card 134a that can be removed from the camera body 101. In this case, the memory card 134a into which the recorded video data has been recorded is inserted into a memory card reader 152 provided in the information processing apparatus 170; the recorded video data can then be transferred to the information processing apparatus 170, whereupon the noise removal process is carried out. It is therefore unnecessary to connect the single-lens reflex digital camera 100 and the information processing apparatus 170 using the communication cable 151. Of the operations in the noise removal process, only the operation for loading the recorded video data from the memory card in S3101 of FIG. 18 has been changed. Meanwhile, if the information processing apparatus 170 is provided with a device for reading the memory card 134a, the memory card reader 152 is unnecessary. In other words, the information processing apparatus 170 according to the present embodiment can operate independently. Any apparatus capable of processing audio signals may be employed as the information processing apparatus 170 according to the present embodiment. For example, a personal computer, a smartphone, an image capturing apparatus, a television, or the like may be employed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-074855, filed Mar. 29, 2013, which is hereby incorporated by reference herein in its entirety.

What is claimed is:

1. A signal processing apparatus comprising:
a CPU;
a detection unit which is implemented by the CPU and is configured to detect, in a received audio signal, a noise-containing period in which noise is mixed in;
a determination unit configured to determine whether a phoneme is the same or different between before and after the noise-containing period; and
a noise reduction unit configured to generate an interpolated signal for the noise-containing period using audio signals in backward and forward periods of the noise-containing period and to reduce the noise by replacing the audio signal of the noise-containing period with the interpolated signal,
wherein the noise reduction unit:
generates a first predicted signal in the noise-containing period by copying the audio signal on a forward segment of the noise-containing period;
generates a second predicted signal in the noise-containing period by copying the audio signal on a backward segment of the noise-containing period;
generates the interpolated signal by crossfading the first predicted signal and the second predicted signal; and
controls a method for generating the interpolated signal by adjusting, in accordance with a result of the determination performed by the determination unit, a length of time for which the first predicted signal and the second predicted signal overlap during the crossfade.

2. The signal processing apparatus according to claim 1, wherein the length of time of the overlap is adjusted by adjusting window functions used for the first and second predicted signals, respectively, in the crossfade.

3. The signal processing apparatus according to claim 2, wherein the determination unit:
calculates a first maximum value that is a maximum value of a correlation between an audio signal in a first reference period on the forward segment and an audio signal in a first calculation period on the forward segment;
calculates a second maximum value that is a maximum value of a correlation between an audio signal in a second reference period on the backward segment and an audio signal in a second calculation period on the backward segment;
calculates a third maximum value that is a maximum value of a correlation between the audio signal in the first reference period and the audio signal in the second calculation period;
calculates a fourth maximum value that is a maximum value of a correlation between the audio signal in the second reference period and the audio signal in the first calculation period; and
determines that the phoneme is the same between before and after the noise-containing period in the case where a ratio of the first maximum value to the third maximum value and a ratio of the second maximum value to the fourth maximum value are within respective predetermined ranges, and
wherein the noise reduction unit adjusts the window functions so as to reduce the length of time of the overlap in the crossfade in the case where the determination unit has determined that the phoneme is different between before and after the noise-containing period.

4. The signal processing apparatus according to claim 3, further comprising:
a unit that normalizes a sound pressure level between before and after the noise-containing period prior to the determination performed by the determination unit.

5. The signal processing apparatus according to claim 2, wherein the noise reduction unit adjusts the window functions so that the first predicted signal and the second predicted signal do not overlap due to the crossfade in the case where a length of time of the noise-containing period exceeds a predetermined time threshold.

6. The signal processing apparatus according to claim 5, wherein in the case where a silent period has been produced between the first predicted signal and the second predicted signal due to the window functions being adjusted so that the first predicted signal and the second predicted signal do not overlap, the noise reduction unit adds comfort noise to the silent period.

7. The signal processing apparatus according to claim 2, wherein the determination unit determines that the phoneme is the same between before and after the noise-containing period in the case where a difference between sound pressure levels before and after the noise-containing period is within a predetermined range.

8. The signal processing apparatus according to claim 1, wherein the noise reduction unit does not control the method for generating the interpolated signal in the case where a length of time of the noise-containing period is shorter than a predetermined time threshold.

9. The signal processing apparatus according to claim 1, further comprising:
an image capturing unit,
wherein the detection unit detects a period of the received audio signal in which noise produced by driving the image capturing unit is mixed in as the noise-containing period.

10. The signal processing apparatus according to claim 1, further comprising:
an image capturing unit,
wherein the detection unit includes a vibration detection unit that detects vibrations produced by the image capturing unit being driven, and detects a period in which the vibration detection unit has detected vibrations as the noise-containing period.

11. A control method for controlling a signal processing apparatus which processes an audio signal, the method comprising the steps of:
detecting, in a received audio signal, a noise-containing period in which noise is mixed in;
determining whether a phoneme is the same or different between before and after the noise-containing period; and
generating an interpolated signal for the noise-containing period using audio signals in backward and forward periods of the noise-containing period;
reducing the noise by replacing the audio signal of the noise-containing period with the interpolated signal,
wherein the step of generating the interpolated signal:
generates a first predicted signal in the noise-containing period by copying the audio signal on a forward segment of the noise-containing period;
generates a second predicted signal in the noise-containing period by copying the audio signal on a backward segment of the noise-containing period;
generates the interpolated signal by crossfading the first predicted signal and the second predicted signal; and
controls a method for generating the interpolated signal by adjusting, in accordance with a result of the determination performed in the step of determining, a length of time for which the first predicted signal and the second predicted signal overlap during the crossfade.

* * * * *